United States Patent [19]

Goudey

[11] 4,119,300

[45] Oct. 10, 1978

[54] BOLLARD-HANGER AND COUPLER SYSTEM

[75] Inventor: Clifford Goudey, Arlington, Mass.

[73] Assignee: Massachusetts Institute of Technology, Cambridge, Mass.

[21] Appl. No.: 799,903

[22] Filed: May 23, 1977

[51] Int. Cl.² ............................................. B66D 1/36
[52] U.S. Cl. .................................... 254/192; 254/167; 254/137
[58] Field of Search ............... 254/173 R, 135 R, 137, 254/195, 196, 192, 167, 175.7, 175.5; 59/93; 24/115 CH; 403/24; 114/242, 249, 251, 253

[56] References Cited

U.S. PATENT DOCUMENTS

| 926,453 | 6/1909 | Archibald | 254/196 |
|---|---|---|---|
| 2,045,533 | 6/1936 | Smaltz | 254/135 R |
| 2,097,957 | 11/1937 | Stahl | 254/167 |
| 3,385,563 | 5/1968 | Stinson, Jr. | 254/195 |
| 3,446,484 | 5/1969 | Walsh et al. | 254/173 R |
| 4,023,775 | 5/1977 | Beattie | 254/175.7 |

*Primary Examiner*—Trygve M. Blix
*Assistant Examiner*—Kenneth Noland
*Attorney, Agent, or Firm*—Arthur A. Smith, Jr.; Martin M. Santa

[57] ABSTRACT

A hanging bollard has a pivotally attached hanger which is capable of supporting a load by a line coupling device. A preferred form of the coupling device is spring loaded to allow detachment of the bollard cable from the load only when the coupler and load are supported by the hanger. The hanger is pivoted out of the coupler engaging position when the bollard is to be used as a conventional bollard.

9 Claims, 4 Drawing Figures

BOLLARD-HANGER AND COUPLER SYSTEM

This invention was made in the course of work supported by the Department of Commerce, National Oceanic and Atmospheric Administration, Office of Sea Grant, Contract No. 04-6-158-44007.

BACKGROUND OF THE INVENTION

This invention relates to a load support device for use with a conventional bollard, and more particularly to a coupling device and bollard hanger capable of supporting a load to allow decoupling of the load from the bollard line.

There exist many applications where bollards are used to haul loads where after the load has been at least partially hauled in, it is desired to support the load while the bollard line is disconnected from the load. The bollard may then be used to haul on a different load. To do this with existing devices is awkward and dangerous. As an example of one such application, there presently exists in the fishing industry the need to safely and quickly secure the trawl boards to the side or stern of a fishing trawler before the trawl net can be brought aboard for emptying. The existing procedure is to secure the trawl boards with a chain-hook which is manually passed through brackets on the trawl board. This procedure can be slow and dangerous when the boat is being tossed about in heavy seas.

It is therefore a primary object of this invention to provide a device which will allow a load being hauled by a bollard to be automatically secured to a bollard attachment thereby providing a system which is safer and quicker than existing methods.

It is a more specific object of this invention to provide a load securing system which uses an attachment to the hanging bollard presently used on fishing trawlers to haul in the trawl board and net and not to interfere with the conventional use of the bollard in continuing to haul in the net after the trawl board has been secured.

A further object of this invention is to provide a coupling system which engages reliably on the bollard attachment and when so engaged allows easy uncoupling and coupling of the bollard line from a load.

A further object of this invention is to provide a coupling system which is dependable, easy to inspect and maintain, and which will not accidentally uncouple should the tow cable become slack.

A further object of this invention is to facilitate ease and economy of construction by incorporating standard rigging and hardware items within the system.

Is it a feature of this invention to provide swiveling capability in the coupling system to eliminate the need for the main tow cable swivel used when towing a net, and thereby eliminating troublesome failure due to undetected swivel wear.

SUMMARY OF THE INVENTION

A hanging bollard has a pivotally attached hanger which is capable of supporting a load by a coupler. The preferred coupling device is spring loaded to allow detachment of the bollard cable from the load only when the coupler is being supported by the hanger. The hanger is pivoted out of the way when the bollard is to be used as a conventional bollard.

DESCRIPTION OF THE DRAWINGS

Other advantages, features, and objects of the invention will appear from the following description taken together with the drawings in which.

DESCRIPTION OF THE INVENTION

Figure 1:
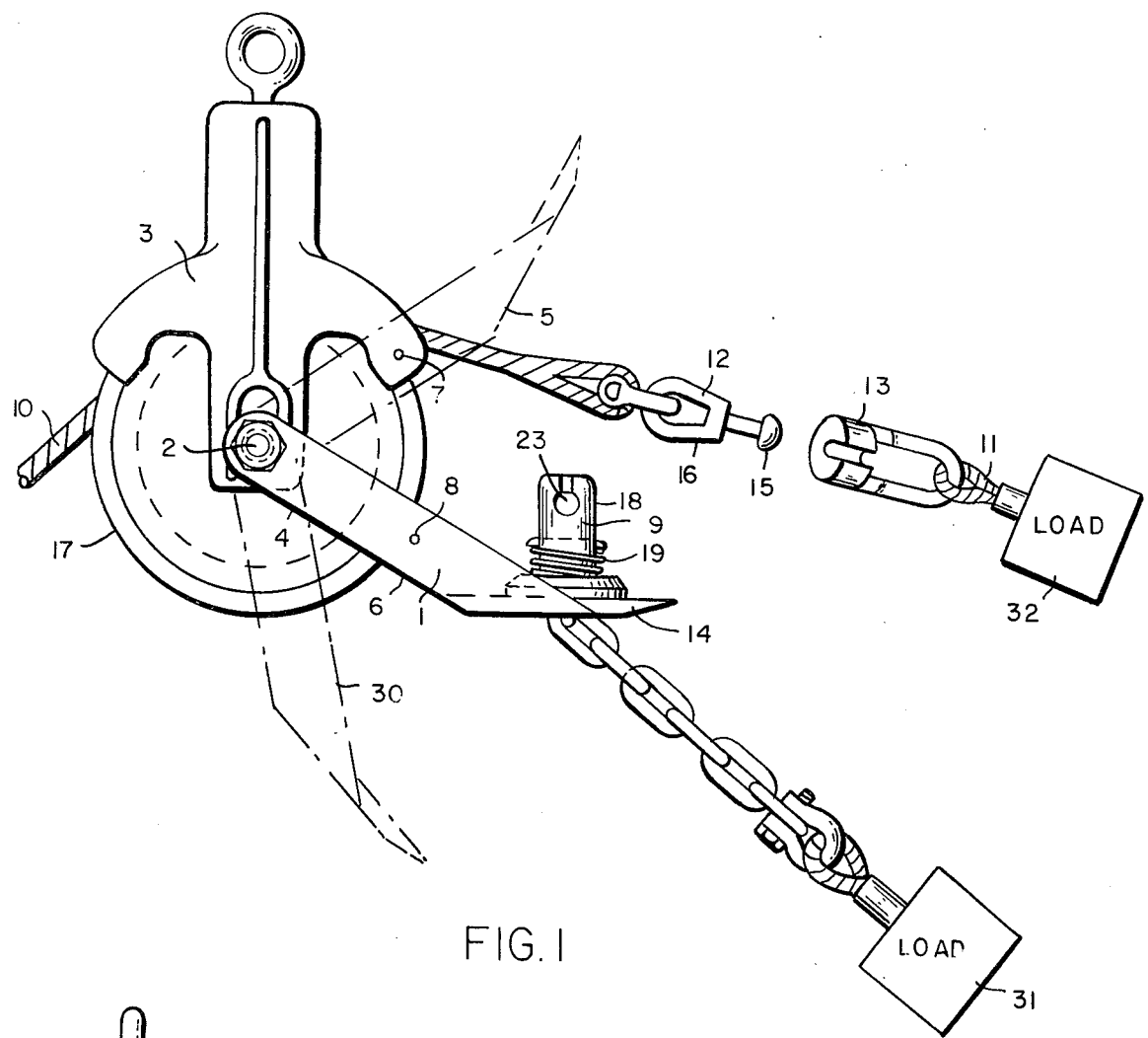
FIG. 1 is a side view of an embodiment of the invention showing the hanging bollard with the hanger in different positions.
Figure 2:
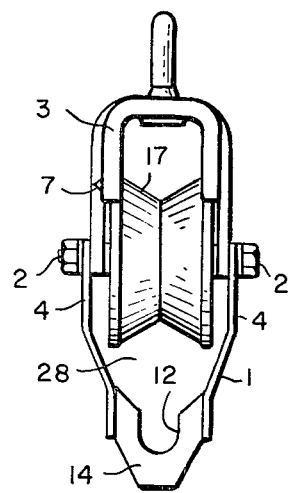
FIG. 2 is a front view of the bollard and hanger of FIG. 1.

The hanging bollard 3 and hanger 1 of this invention is shown in side and front views in FIGS. 1 and 2, respectively. The hanger 1 has legs 4 which are pivotally mounted on shaft 2 of the pulley 17 of bollard 3. The other ends of the legs 4 are connected by a U-shaped web 14 having a slot 12. The space 28 between the web 14, its legs 4 and the pulley 17 is large enough to allow coupler 9 to pass through it.

FIG. 1 shows three different positions for hanger 1, two indicated by dotted lines. The upper position 5 is the normal stowed position for the hanger 1 which is held in position 5 by a catch such as a round-ended set screw 7 which engages indentation 8 on the inside of the arm 4. The middle position 6 of hanger 1 occurs when the coupling device 9 is engaged by web 4 and a downward and outward pull for a load 25 is experienced. The lower position 30 of hanger 1 is assumed when the bollard cable 10 hauls on a load 32 and hanger 1 is supporting load 31. Typically, load 32 is the pull from the net taken by the tow cable 10 after it is connected to the idler cable 11 by the ball coupler 12 and plain socket coupler 13. Hanger 1 is at that time being pulled down by the weight or load 25 which is the trawl board.

As the tow cable 10 is being winched aboard, the hanger 1 is pulled down from its stowed position 5 so that it rides along the cable as it comes in. When the coupler 9 reaches the hanger 1 the latter deflects upwards until the base 29 of coupler 9 passes through opening 28, at which time the winch operator stops the winch and the coupler 9 pulls back into the engagement position with web 14. Slot 12 is wide enough to accommodate chain link 22 to allow base 29 to rest securely as web 14. The angle between the web 14 and the arms of the hanger 1 is such that the angle allows the coupler 9 to ride under the web 14 freely. A typical angle is 45°.

To release the trawl board, the cable 10 is taken up by the winch until the coupler 9 is clear of the web 14 of the hanger 1 and the crew pushes the hanger up to its stowed position 5. The net and boards can then be let out with no interference with the hanger 1.

Figure 3:
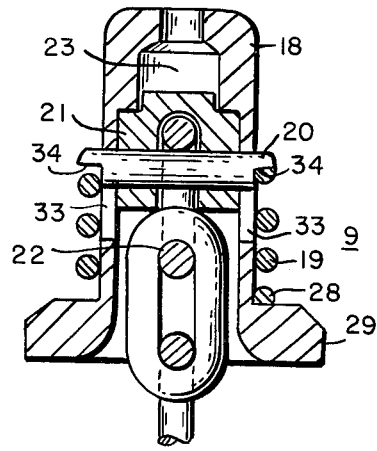
FIG. 3 is a cross-sectional view of the coupling device of this invention.

The socket coupling device 9 is shown in cross-sectional detail in FIG. 3. The conventional ball coupler 12 as shown in FIG. 1 is composed of a ball 15 connected to an eye 16. The socket coupler 9 is seen to consist of a hollow housing 18, a coil spring 19, a load pin 20 and a plunger 21. The load pin 20 is passed through the last link of chain 22 connected to the trawl board. The load pin 20 is constrained to stay within housing 18 by the longitudinal slots 33 is housing 18 and by notches 34 at the ends of pin 20 which engage spring 19. In the trawling operation, should the cable 10 go slack, spring 19 will push up on load pin 20 and plunger 21 to prevent ball coupler 12 from decoupling through the enlarged slot 23 in the side of the housing 18.

When the coupler 9 is supported by web 14 in the hanger 1 the spring 19 is compressed by the load of the trawl board load 25 and the ball coupler 12 can readily be removed from slot 23 when the tension on cable 10 is relaxed.

Figure 4:
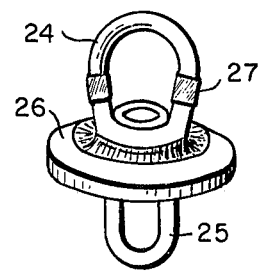
FIG. 4 is a perspective view of another coupler for use in the invention.

FIG. 4 shows an alternate coupling device for use with standard connecting hooks which may also be supported by hanger 1. It consists of an eye nut 24 and an eye bolt 25 separated by a disk 26 of diameter similar to the base 29 of the socket coupler housing 18. The three pieces are connected together by the threads on the eye bolt 25 or by welding or both. The eye nut 24 has flats 27 in the sides to permit engaging with the standard hook.

The plain socket coupler 13 is shown in FIG. 1. Because coupler 13 is used when hauling in the net attached to idler cable 11, it is always under tension, and it does not require a spring load feature.

While the operation of the invention has been described in the context of the particular application for which it was devised, it will be apparent that the invention may be applied to any situation where a load is to be supported by a bollard hanger in order to disconnect the untensioned hauling cable 10 from the load.

It is apparent that the spring-loaded coupler 9 design of FIG. 3 can be modified by those skilled in the art as by eliminating plunger 21 and having a link of chain 22 press directly on ball 15. Alternately, pin 20 may be T-shaped and with an eye at the bottom of the T for connection to a chain or cable. Also, the spring can be arranged to hold plunger 21 against ball 15 by the force of compression, rather than by force of extension as in FIG. 3, by causing spring end 28 to be secured at the other end of coupler 9.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Apparatus to be used in conjunction with a bollard having a pulley and which supports a load by a line coupler comprising:
   a U-shaped hanger having an end portion and sides connected thereto,
   said hanger being pivotally attached to the bollard at the free ends of said sides of the hanger to allow said hanger to rotate about an axis parallel to that of the bollard pulley axis of rotation,
   a bollard hauling line passing around the pulley of said bollard and connected to the coupler,
   a load line connected between the load and the line coupler,
   the space between the sides and said end portion of the U-shaped hanger and the bollard pulley being larger than the diameter of the hauling and load lines and the line coupler to allow said coupler to pass through the space,
   said end portion of the U-shaped hanger being adapted to support said coupler and said load when said bollard hauling line is relieved of tension after said coupler has been Hauled-in past said space,
   said line coupler comprising a first portion connected to the hauling line and second portion connected to the load line, said portions of said coupler being separable when said second portion of the coupler is supported by said hanger.

2. Apparatus of claim 1 comprising in addition:
   wherein said hanger is adapted to be secured to the bollard to maintain the hanger in a position out of contact with the cable when said hanger is not to be used to support said coupler.

3. The apparatus of claim 1 wherein said coupler comprises:
   The apparatus of claim 1 wherein said coupler comprises:
   a first portion comprising a ball connector for attachment to said hauling line,
   a second portion comprising a housing having a socket recess adapted to engage said ball,
   a spring means for applying pressure to retain said ball in said socket,
   a means for compressing said spring to remove said pressure on said ball,
   means for attaching a load to one end of said compressing means,
   said housing being connected to the other end of said spring to resist the force exerted on said spring by a load on said attaching means,
   said ball capable of being removed from said socket when said housing is being supported by said hanger.

4. The apparatus of claim 1 wherein said coupler comprises:
   a ball and socket coupling mechanism comprising:
   a first portion comprising:
   a ball with an eye connected thereto and attached to said hauling line,
   a second portion comprising:
   a socket coupler for coupling to said ball comprising,
   a housing containing a socket,
   a spring,
   a load pin,
   a plunger,
   a chain being connected to said load pin,
   said spring forcing said load pin against said plunger by spring pressure against said load pin, the other end of said spring being constrained from movement by being in contact with said housing, said chain when loaded tending to compress said spring,
   said pressure on said plunger being sufficient to hold said ball in said socket when there is no load in the line,
   said housing being so constructed to allow support by a means capable of supporting the housing against the force produced by the load on the chain,
   said supporting force on said housing resisting the force produced by the load to thereby cause said pin to move away from said socket against the force of said spring,
   said plunger being displaced from said socket to allow said ball to be removed or inserted into said socket when said spring is compressed.

5. Apparatus to be used in conjunction with a bollard having a pulley and which supports a load by a line coupler connecting a hauling bollard cable to a load line comprising:

a U-shaped hanger having two legs and a web joining said legs at one end, said hanger being pivotally attached to the bollard at the other ends of its legs to allow said hanger to rotate about an axis parallel to that of the bollard pulley axis of rotation, the space between the legs, the web and the bollard pulley being larger than the diameter of the line coupler to allow said coupler to pass through the space, the web being adapted to support said coupler and said load when said bollard cable is relieved of tension, said web having a slot wide enough to allow said load line to slide into said slot to allow the coupler to be positioned over the web and to be thereby supported by the web.

6. Apparatus of claim 5 comprising in addition:

wherein said hanger is adapted to be secured to the bollard to maintain the hanger in a position out of contact with the cable when said hanger is not to be used to support said coupler and said bollard is to be used as a conventional bollard.

7. The apparatus of claim 5 wherein said pivotal attachment of the hanger to the bollard is made at the pulley shaft of said bollard.

8. The apparatus of claim 7 wherein said web has a slot smaller than said coupler, said slot being large enough to allow the line connected to a load to pan into the slot, the slot of said web being in communication with the space between the legs, the web and the bollard pulley.

9. The apparatus of claim 5 wherein:

said web is at an acute angle with respect to the coupler-side of the bollard line at its point of contact therewith when in contact with the bollard line to allow said web to slide over said coupler when said line is being hauled in and to slide under said coupler when said coupler moves in the direction corresponding to paying out the line after said coupler has previously passed through the hanger.

* * * * *